United States Patent Office 3,271,950
Patented Sept. 13, 1966

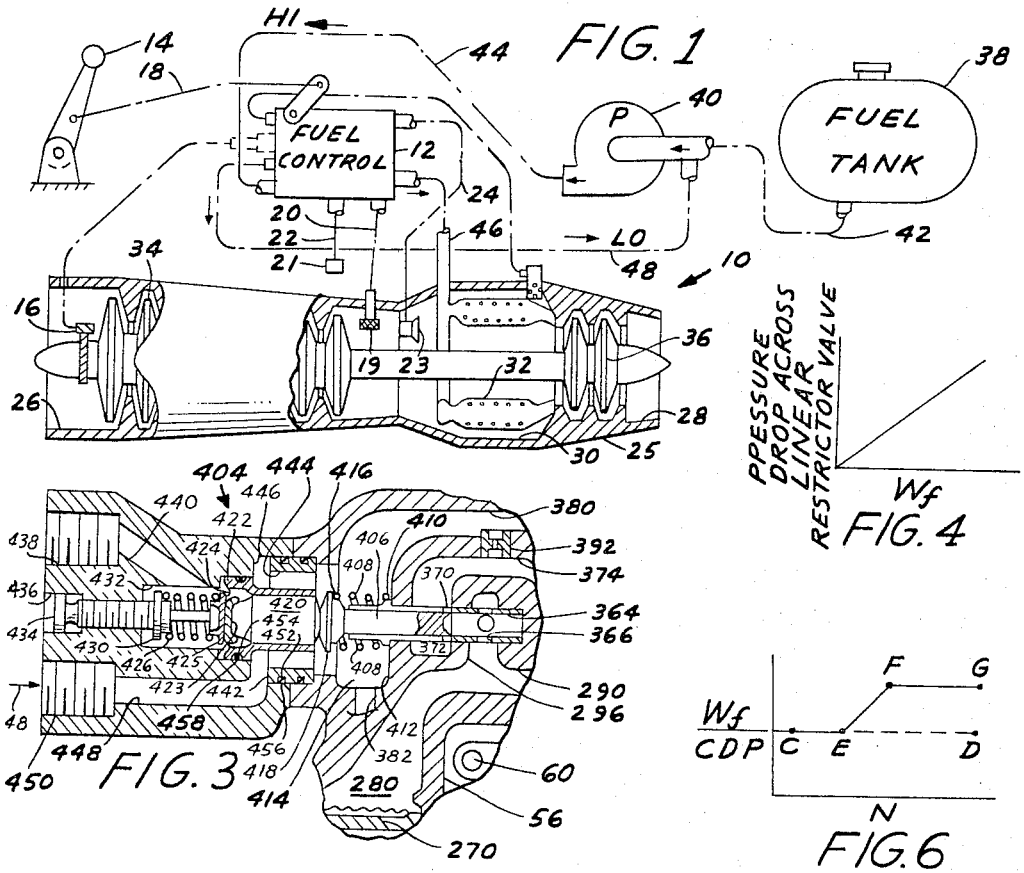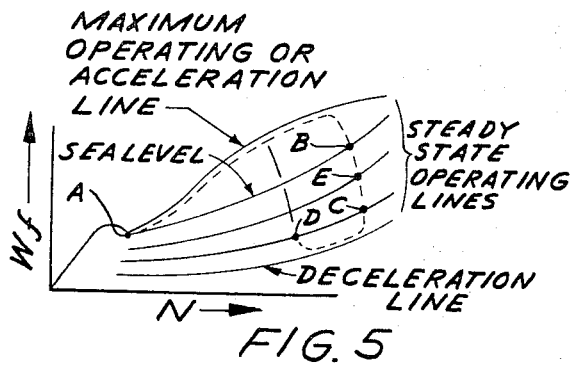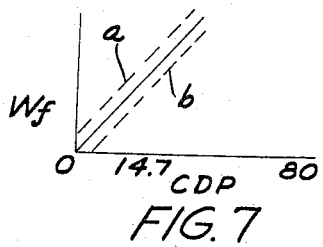

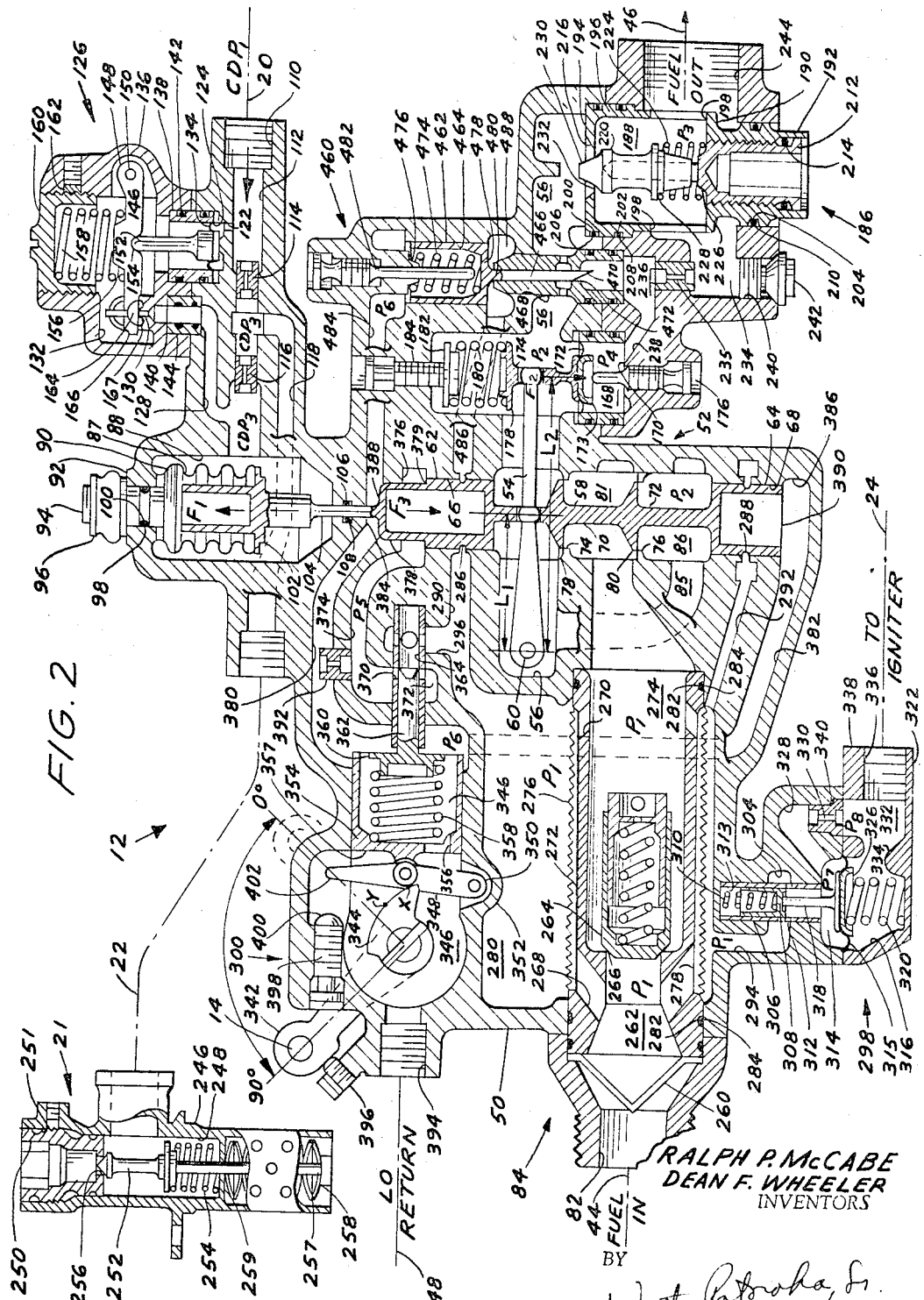

3,271,950
GAS TURBINE FUEL CONTROL
Ralph P. McCabe, Warren, and Dean F. Wheeler, Detroit, Mich., assignors to Holley Carburetor Company, Warren, Mich., a corporation of Michigan
Filed Dec. 20, 1963, Ser. No. 331,996
13 Claims. (Cl. 60—39.28)

This invention relates generally to fuel controls, and more particularly to closed-loop scheduling types of fuel controls for gas turbine engines.

It is well known that parameters such as pressure, speed and temperature may be used individually and/or collectively in fuel systems for controlling and determining the operation of gas turbine power plants. However, the means heretofore employed to sense these various parameters and to provide corresponding input signals or control forces have generally been rather complex, often involving squared factors resulting from restriction or orifice type flow usually employed.

A novel means for eliminating the necessity of coping with squared flow factors, resulting in a much less expensive and more compact fuel control system, has been disclosed in U.S. application Serial No. 264,117, filed on March 11, 1963, in the name of Warren H. Cowles, now abandoned.

This invention embodies many of the features of the fuel control system disclosed by the above referenced application, as well as other novel features producing a number of advantages over previously known systems.

Accordingly, it is a primary object of the invention to provide a lightweight, compact, high pressure, hydromechanical computing type fuel control which will determine the engine fuel requirements by novel embodiments of pressure and speed sensing means.

Another object of the invention is to provide a fuel control which is sufficiently versatile for co-ordinating a wide variety of engine characteristics.

Still another object of the invention is to provide such a control wherein the simplicity of design is directed toward uniform reliability.

A further object of the invention is to provide a fuel control system having novel governing and speed biasing devices operating in conjunction with a high pressure acceleration fuel system.

A more specific object of the invention is to provide a novel mechanical force balance type governor mechanism which may operate in a fuel control mechanism in conjunction with an external centrifugal pump, with the magnitude of the pump pressure rise being used as an indication of speed.

An additional object of the invention is to provide a hydraulic governor mechanism which may be used with the centrifugal pump in lieu of the mechanical governor mechanism.

These and other objects and advantages of the invention will become apparent when reference is made to the following specification and to the accompanying drawings wherein:

FIGURE 1 is a schematic illustration of a gas turbine engine including a fuel control embodying the invention;

FIGURE 2 is a schematic cross-sectional view of the fuel control shown in FIGURE 1.

FIGURE 3 is a fragmentary cross-sectional view of a modification of the governor portion of the fuel control shown in FIGURE 2;

FIGURE 4 is a graph illustrating generally the relationship of fuel flow ($W_f$) to pressure drop ($P_2-P_4$) in the fuel control shown and described herein;

FIGURE 5 is a graph illustrating generally the relationships of fuel flow ($W_f$) to engine speed (N) for various engine operating conditions such as acceleration, steady state, and declaration;

FIGURE 6 is a graph illustrating generally one of the characteristics of a fuel control embodying the invention; and FIGURE 7 is a graph illustrating another possible operating characteristic of a control embodying the invention.

Referring now in greater detail to the drawings, FIGURE 1 illustrates schematically a gas turbine engine 10 having a fuel control 12 which is responsive to manual control by means of a selector lever 14, to engine speed by means of a gear box 16 and transmission line 18, to compressor discharge pressure via a pressure probe 19 and conduit 20, and to temperature via a temperature sensor 21 and conduit 22. The fuel control 12 further includes means for furnishing fuel to the igniter 23 of the engine 10 via a conduit 24.

While the fuel control 12 shown and to be described herein is responsive to particular parameters, it should be understood that certain novel features of the invention may be employed in a fuel control responsive to other parameters, such as temperature and engine pressures other than that specified herein. As to those features, no limitations are intended by the particular parameters employed in the present disclosure for purposes of illustration.

A typical gas turbine engine 10 includes an outer housing 25 having an intake 26 and exhaust nozzle 28. A combustion chamber 30 having a fuel distribution ring 32 therein is located within the housing 24 between the compressor 34 and turbine 36.

A fuel supply system generally comprises a fuel tank 38, an engine driven centrifugal pump 40, and supply conduits 42 and 44 for delivering fuel to the fuel control 12. The fuel control 12 meters the correct fuel flow for the particular engine operating requirements, as dictated by the above mentioned engine speed and compressor discharge pressure parameters, in a manner which will be described below. Correctly metered fuel is transferred to the fuel distribution ring 32 via a conduit 46, any excess fuel being returned to the inlet side of the pump 40 via a return conduit 48, in a manner to be described.

*Acceleration fuel system*

As seen in FIGURE 2, the fuel control 12 comprises in part a plural cavity housing 50 formed in any suitable manner and containing an acceleration fuel system 52. A force balance lever 54 is pivotally secured to the fuel control housing 50 in one of the chambers 56 therein. A valve stem 58 is pivotally connected to the lever arm 54 at a predetermined distance $L_1$ from the pivot point 60 of the lever 54, so as to be positioned substantially perpendicular to the lever arm 54. The ends 62 and 64 of the valve stem 58 may be slidably confined within guide members 66 and 68, respectively. Two reduced diameter portions 70 and 72 formed on the stem 58 operate through a pair of annular openings or valve seats 74 and 76 formed within the housing 50, so that spaced shoulders 78 and 80 function as a pair of throttling valves, hereinafter referred to as valves 78 and 80. Fuel from the pump 40 enters the chamber 81 located between the valves 78 and 80 via the conduit 44, the inlet port 82 and a filtering system 84 which will hereinafter be described. A passageway 85 communicates between a chamber 86 adjacent the valve 80 and the chamber 56 in order that the pressure on opposite ends of the throttling valve 58 may be substantially equal.

An evacuated bellows 87 in another chamber 88 of the housing 50 is fixedly attached at its one end 90 to a wall 92 of the housing 50, as by a stud 94 and nut 96. A seal 98 located in a notch 100 in the stud 94 seals off the chamber 88 from the atmosphere. The other end 102 of the evacuated bellows 87 is secured to an extension 104 of the valve stem 58 by any suitable means. A seal 106 located in a notch 108 in the housing 50 prevents leakage from either direction past the extension 104.

Compressor discharge air pressure, $CDP_1$, enters an inlet port 110 in the housing 50 via the conduit 20 and is communicated to the chamber 88 by means of passageway 112, the latter having a pair of fixed restrictions 114 and 116 therein resulting in pressures $CDP_2$ and $CDP_3$. Pressure $CDP_3$ is referenced to absolute zero by virtue of the bellows 87 being evacuated. If desired, the compressor discharge pressure, $CDP_2$, may be bled off from a point intermediate the fixed restrictions 114 and 116, once it exceeds a predetermined value, via a passageway 118 and the conduit 22 by incorporating a temperature sensor 21 in the system. The structure and function of a typical temperature sensor 21 will be described later.

A port 122 communicates between a point upstream of the fixed restrictions 114 and 116 in the passageway 112 and a chamber 124 wherein a compressor pressure limiter assembly 126 is located. A branch passageway 128 including a restriction 130 communicates between a point downstream of the two fixed restrictions 114 and 116 and a chamber 132. A diaphragm 134 forms a movable wall between the chambers 124 and 132. To facilitate construction, the chamber 132 may be formed in a separate housing 136 attached to the main housing 50 in any suitable manner. Leakage between the two housing members 50 and 136 may be prevented by means of a pair of inserts 138 and 140, each containing a pair of seal rings 142 and 144. One of the inserts 138 may serve as an upper retainer for the diaphragm 134.

The compressor pressure limiter assembly 126 comprises a shaped lever 146 pivotable about one end 148 on a pivot pin 150 and a member 152 operable as a continually abutting linkage between the diaphragm 134 and a recess 154 formed in the underside of the lever 146. The pressure in the chamber 132 is atmospheric due to a leakage space or clearance provided around the pivot pin 150. A circular projection 156 formed on the upper side of the lever 136 serves as a movable seat for one end of a spring 158, the other end of the spring 158 abutting against a recessed plug 160. A set screw 162 may be inserted in the wall of the housing 136 to retain the plug 160 in place. A valve 164 fixedly attached to the free end 166 of the lever 136 is at times raised off the valve seat 167 to allow communication between the passage 128 and the chamber 132 for a purpose to be described later.

Returning now to the chamber 56 and the force balance lever 54, an adjoining chamber 168 is formed by sealing a recess 170 formed in the wall of the chamber 56 with a feed-back diaphragm 172. A washer 173 is fastened to one side of the diaphragm 172 while a stem 174 extends from the other side into the chamber 56 and is pivotally attached to the free end of the lever arm 54 at a second predetermined distance $L_2$ from the fixed pivot point 60. An adjustable stop 176 extending from the housing 50 into the chamber 168 serves to limit the downward movement (FIGURE 2) of the diaphragm 172 in order to prevent diaphragm damage and to provide for minimum fuel flow through the chamber 56. A spring seat 178 is formed on the end of the stem 174 at the side of the chamber 56 opposite the diaphragm 172. The free end of the lever arm 54 is pivotally connected to the stem 174 at a point intermediate the diaphragm 172 and the spring seat 178. A spring 180 is confined at its one end by the spring seat 178 and at its other end by a spring mount 182. The latter may be adjusted by a manually adjustable screw 184 for a purpose to be described.

A so-called linear restrictor valve assembly 186 is located within still another chamber 188 formed within the housing 50. The valve assembly 186 comprises a main body 190 having one end 192 thereof internally threaded and the other end 194 thereof formed to include a flange or shoulder 196 for insertion into an inner wall of the housing 50. A plurality of ports 198 are formed through the main body wall 190, and grooves 200, 202 and 204 are formed circumferentially around the outside wall for the insertion of seal rings 206, 208 and 210 therein. A manually adjustable plug 212 and another seal ring 214 are threadedly inserted into the internal threads of the main body 190. A knife-edge opening through the shoulder end 194 of the main body 190 serves as a valve seat 216 for a valve member 220 which is slidably mounted on an extension 222 of the manually adjustable plug 212 in the chamber 188. A spring 224 is mounted between a surface 226 on the manually adjustable plug 212 and a flange 228 formed around the outer wall of the valve 220. A contoured section 230 formed on the end of the valve 220 functions as a variable orifice 232 by virtue of its reciprocal movement relative to the knife-edged valve seat 218, for a purpose that will be described.

Communication between the chambers 188 and 168 occurs by way of one of the ports 198, a chamber 234, a fixed restriction 235, a chamber 236 and a passageway 238. For purposes of assembly, access to the chamber 234 may be through an opening 240 in a wall of the housing 50, the opening 240 being normally closed by the insertion therein of a plug member 242. Communication between the chamber 188 and the previously mentioned conduit 46 leading to the fuel distribution ring 32 is maintained through the outlet port 244 and another of the ports 198 of the linear restrictor valve body 190.

*Temperature sensor*

As previously mentioned, a temperature sensor 21 may be incorporated in the system in order to bleed off $CDP_2$ once it exceeds a predetermined value as a result of an increase or decrease in temperature of some selected medium. In other words, in a particular engine it may be desirable to bleed off $CDP_2$ when a particular higher regenerator temperature is reached or when ambient temperature decreases below a preselected value as a result of an increase in altitude.

This may be accomplished by incorporating the temperature sensor mechanism 21 in the line 22, as illustrated in FIGURES 1 and 2. The temperature sensor 21 may comprise a housing 246 including a chamber 248, an atmospheric bleed 250 through an adjustable plug 251 and a valve 252 urged by a spring 254 toward an opening 256 in the plug 251. Bimetallic disks 257 may be confined between the end 258 of the valve 252 and an internal flange 259 of the housing 246.

Depending upon the disks 257 selected, an increase or a decrease in temperature would cause the disks 257 to contract, thereby permitting the spring 254 to urge the valve 252 further away from the opening 256, resulting in the bleeding off of $CDP_2$ through the bleed port 250.

*Filtering system*

Fuel entering the inlet 82 via the conduit 44 from the pump 40 must first pass through a filtering screen 260 into the chamber 262. A check valve 264, which is normally urged into a closed position against a valve seat 266, forces the fuel to flow through ports 268 and 270 and a cylindrical passageway 272 at an increased velocity into the chambers 274 and 81. Some fuel will flow through a filtering sleeve 276 into the cylindrical passageway 278 and chamber 280. The ends of the filtering sleeve 276 may include grooves 282 for the insertion of seal rings 284. Should the filtering sleeve 276 and the adjoining cylindrical passage 278 become clogged, the pressure of the fuel in the passageway 278 would increase, thereby increasing the fuel pressure in the ports 268 and the chamber 262 and thus move the valve 264 off the seat 266 and permit flow from the chamber 262 directly into the chamber 274.

A portion of the filtered fuel in the cylindrical passageway 278 and the chamber 280 is communicated to annular grooves 286 and 288 around the throttling valve stem 58 via passageways 290 and 292, respectively. The clean fuel in the grooves 286 and 288 serves to wash the sliding surfaces of the valve stem 58, thereby maintaining a continual reliable operation.

Still another portion of the filtered fuel is communicated via passageways 294 and 296 to the igniter and governing systems 298 and 300, respectively, for purposes to be described.

Igniter valve

As just mentioned, the passageway 294 communicates between the cylindrical passageway 278 and the igniter system 298. Specifically, the passageway 294 connects with an annulus 304 around a sleeve 306 wherein a valve 308 is urged by a spring 310 past a plurality of ports 312. The valve 308 forms a wall between an atmospheric chamber 313 and a chamber 314 adjacent the ports 312. A diaphragm 315 forms a movable wall between the chamber 314 and another chamber 316. A diaphragm extension 318 into the chamber 314 from the diaphragm 315 is urged into continual contact with the valve 308 by a spring 320 confined at its one end against a wall 322 of the chamber 316 and at its other end by a washer or spring retainer 326 fixedly attached to the diaphragm 315.

A passageway 328 containing a fixed restriction 330 communicates between the chamber 306 and a chamber 332, the latter being connected to the chamber 316 via a passageway 334. An outlet 336 permits the flow of igniter fuel from the chamber 332 to the conduit 23 and thence to the engine 10.

For ease of assembly the diaphragm 315 may be confined between the main housing 50 and a separately attached body portion 338. The fixed restriction 330 may, of course, be threadedly inserted into an opening 340 in the main housing 50 prior to the attachment of the body portion 338.

Mechanical governor

The usual selector lever 14 is connected via suitable linkage 342 with a cam 344 pivotally fastened in a chamber 346 of the housing 50. A lever 348 pivotally connected at its one end 350 to a wall 352 of the housing 50 is urged into abutment with the cam 344 by a spring-loaded piston 354, the latter being slidably located within the chamber 346 and having ports 356 through an end 357 thereof. The spring 358 is confined between the end 357 of the piston 354 and a spring seat 360 formed on an end of a governor servo valve 362. The valve 362 is slidably mounted in a passageway 364 in axial alignment with the piston 354. Ports 366 continually communicate between the passageway 364 and the previously mentioned passageway 296. Ports 370 at times communicate between the passageway 364 and an annulus 273 formed therearound, depending upon the position of the servo valve 362. A passageway 374 communicates between the annulus 372 and an annulus 376 formed in the housing 50 around a reduced portion 378 of the end 62 of the throttling valve stem 58, the reduced portion 378 forming a surface 379 with the end 62.

A pair of passageways 380 and 382 communicate between the chamber 346 and the cavities 384 and 386 adjacent the two end surfaces 388 and 390 of the throttling valve 58 in order to provide a substantially balanced condition therefor. A fixed restriction 392 communicates between the passageways 374 and 380, and an outlet 394 from the chamber 346 connects with the low pressure return conduit 48.

A manually adjustable screw 396 in the main body housing 50 controls the maximum speed of the engine 10 by limiting the counterclockwise movement of the manual lever linkage 342. This determines the highest point of the cam 344 which may contact the lever 348. Idle speed is controlled by a second manually adjustable screw 398 threadedly inserted through a wall of the housing 50 into the chamber 346 where the end 400 serves as a stop for the free end 402 of the lever 348. This determines the limit of movement of the lever 348 while progressing from the highest toward the lowest point of the cam surface 344.

Hydraulic governor

A hydraulic governor 404 may be used in lieu of the above mechanical governor, as illustrated in FIGURE 3 wherein elements corresponding to elements of FIGURE 2 bear the same reference numerals. A servo valve 406, slidable within the passageway 364, is urged by a spring 408 in a direction which opens the ports 370. One end of the spring 408 abuts against a wall 412 of the chamber 414 while the other end is retained by a flange formed on the outer end of the valve 406. A piston 420, slidably mounted within a flanged sleeve member 422, is retained between the flanged end 418 of the valve 406 and a washer 423 fixedly attached to a diaphragm 424. A movable member 425, which serves as a retainer for the free end of a spring 426, is urged into continual contact with the diaphragm 424 by the spring 426. The other end of the spring 426 is fixedly retained by a second retaining member 430 in a chamber 432, the position of member 430 being varied by means such as a manually adjustable screw 434 threadedly inserted through an opening 436 in an outer wall of the housing 50. An inlet 438 and a passageway 440 serve to communicate a hydraulic signal from a suitable source (not shown) to the chamber 432.

A plurality of ports 442 are formed through the flanged end 444 of the sleeve member 422. The ports 442 communicate between the chamber 414 and an annulus 446 while a passageway 448 and an outlet 450 communicate between the annulus 446 and the low pressure return conduit 48.

The sleeve member 422 and its flanged end 444 may include grooves 452 and 454 around the peripheries thereof for the insertion of seal rings 456 and 458.

Speed bias device

The speed bias device 460 includes a cylindrical body 462 which is slidably mounted in a chamber 464 of the housing 50. A valve stem 466 extends from the body 462, through a member 468 inserted in a wall of the housing 50 and into the previously mentioned chamber 236. The end 470 of the valve stem 466 is tapered in order to provide a variable orifice with an opening 472 between the chamber 56 and the chamber 236.

The tapered end 470 is urged through the opening 472 into the chamber 236 by a spring 474 confined between a retainer 476 formed on a wall of the chamber 464 and the face 478 between the body 462 and the adjoining end 480 of the stem 466. A manually adjustable stop member 482 extends into the open end of the body 462 along the axis of the spring 474, thereby limiting the movement of the valve body 462 in the upward direction (FIGURE 2).

A passageway 484 communicates low pressure fuel between the chamber 464 and the cavity 384 formed at the end 388 of the throttling valve stem 58, while a passageway 486 communicates between the annulus 286 formed around the valve stem 58 and a chamber 488. The face 478 constitutes a movable wall between the chambers 488 and 464. A projection 490 formed on a wall of the chamber 488 serves as a stop member for limiting the movement of the valve body 462 in the downward direction (FIGURE 2).

Operation

Before explaining the operation of the fuel control in detail, it is deemed advisable to first give a brief summary of its operation. As explained above, fuel from the tank 38 is supplied to the inlet 82 by means of the engine driven centrifugal pump 40, the capacity of which is more than sufficient to supply the total fuel requirements for any conditions of engine operation. The portion of the inlet fuel actually supplied to the engine 10 is, of course, determined automatically by the fuel control 12 itself. From the inlet 82, fuel flows into the chamber 262 and thence through the passageways 268, 272 and 270 into the chamber 274 and 81. The fuel is then throttled past the valves 78 and 80, the openings of which depend upon the position of the valve stem 58, into the chamber 56 and thence past the linear restrictor valve 220 into the chamber 188, through the ports 198 and the outlet 244 to the engine 10 through the conduit 46. It will thus be seen that all of the inlet fuel goes to the engine 10, except that fuel which passes through the filtering sleeve 276 into the governing and igniter sections 300 and 298 of the fuel control 12.

It may also be advantageous to first describe generally the operation of the basic closed loop moment balance system and the effect of the linear restrictor valve 220. For this purpose it can be assumed that the system is in equilibrium and that the compressor discharge pressure decreases for some reason or another which is not important in this discussion. With this assumption in mind and referring to FIGURE 2, it can be seen that as the valve stem 58 and the attached lever arm 54 move downwardly in response to a decrease in compressor discharge pressure surrounding the evacuated bellows 87, less fuel is throttled past the valves 78 and 80 into the chamber 56. The linear restrictor valve 220 is then urged upwardly toward a more closed position by a spring 224, resulting in a decrease in pressure in the chambers 188 and 234, through the fixed restriction 235 and in the chamber 236, in the passageway 238 and in the chamber 168 beneath the feedback diaphragm 172.

Ignoring for the moment the effect of the novel speed bias device 460, as well as the effect of the governor servo valve 362, it can be seen from the solid straight line curve of FIGURE 4 that the pressure drop across the valve 220 will decrease lineally as the fuel flow $W_f$ decreases. This linear relationship is achieved by suitably contouring the end 230 of the valve 220. Since the feed-back chamber 168 is in series with the linear restrictor chamber 188, the pressure differential across the diaphragm 172 is a function of engine fuel flow. The reduced pressure across the diaphragm 172 produces a lesser force on the end of the valve stem 58 than before it was moved downwardly (i.e., before the compressor discharge pressure decreased), and results in a return on the moment balance system toward an equilibrium condition. The term "closed loop" is commonly applied to this type of equilibrium-seeking moment balance system, and the above type of operation takes place whenever anything occurs to throw the system out of balance.

If a fixed restriction were employed in lieu of the linear restrictor valve 220, equilibrium could still be attained; however, a much more complicated system of diaphragms, levers and/or springs would be required for use in conjunction with the acceleration fuel lever 54.

The basic closed loop moment balance system having just been explained, the detailed operation of the complete fuel control unit will now be discussed in conjunction with typical fuel flow (Wf) vs. speed (N) curve (FIGURE 5) illustrating the various engine operating conditions. In this discussion, the effect of the novel alternative governing mechanisms 300 and 404 on the moment balance system and the effect of the novel speed bias device 460 on the feed-back diaphragm 172 will become apparent.

It will first be assumed that the engine 10 has been started and that it is idling at sea level, at which time the fuel control unit 12 is receiving fuel at a pressure $P_1$ from the centrifugal pump 40 through the inlet port 82. This idle condition of engine operation is represented by point A of FIGURE 5. The other pressures within the fuel control unit 12 which will be referred to hereinafter are as indicated in FIGURE 2. That is, there is a pressure drop across the valves 78 and 80, resulting in fuel at a pressure $P_2$ being supplied to the chambers 86 and 56; a pressure drop across the orifice 232, resulting in a pressure $P_3$ in the chamber 188, a pressure drop across the fixed restriction 235, resulting in a pressure $P_4$ in the chamber 168, a pressure drop across the opening 370, resulting in a pressure $P_5$ in the annulus 376; a pump return pressure $P_6$ in the governing chamber 346, the passageways 380, 384 and 484 and the speed bias chamber 464; a pressure drop across the opening 312, resulting in a pressure $P_7$ in the igniter system chamber 314; and a pressure drop across the fixed restrictions 330, resulting in a pressure $P_8$ in the chamber 332.

At point A, the system would be in a steady state or equilibrium condition. The compressor discharge pressures hereinafter referred to are, as previously mentioned, $CDP_1$, $CDP_2$ or $CDP_3$, depending upon which point along the passageway 112 is being considered. $CDP_3$ in the chamber 88 would have compressed the evacuated bellows 87 to produce a force, hereinafter called $F_1$, in an upward direction (FIGURE 2). The $P_2$–$P_4$ differential across the feed-back diaphragm 172 produces a force, hereinafter called $F_2$, in a downward direction. This $F_2$ force is suplemented by a force, hereinafter called $F_3$, resulting from the effect of pressure $P_5$ on the surface 379 between the valve end portion 62 and the reduced diameter portion 378. As illustrated in FIGURE 2, $L_1$ and $L_2$ may be any predetermined length along the lever arm 54; therefore, the moment balance equation at steady state may be stated as:

$$F_1 \times L_1 = F_2 \times L_2 + F_3 \times L_1$$

During this initial steady state condition, the free end 402 of the governor lever 348 would be abutted against the end 400 of the idle speed adjustment screw 398. Prior to take off, the manual selector lever 14 would be pivoted so as to rotate the cam 344 in a counterclockwise direction until some point X is in contact with the lever 348. This would have pivoted the lever 348 in a clockwise direction about its fixed end 350 away from the end 400 of the screw 398, thereby moving the piston 354 and hence the valve 362 to the right past the opening 370 while compressing the spring 358. The immediate result would be to prevent fuel flow through the now closed port 370, and hence a reduction in pressure $P_5$ in the annulus 376 to zero. Fuel entering the chambers 262, 274 and 81 from the centrifugal pump 40 would be at an increased pressure $P_1$, pump pressure increasing with the engine speed in the usual manner and being used in the present system as an indication of speed in lieu of the usual gear pump and conventional centrifugal speed sensing mechanism.

This initial transient condition would also result in an increase in $CDP_1$, an hence an increase in $CDP_3$ in the chamber 88. This would serve to compress the bellows 87, thereby lifting the attached valve stem 58, permitting an increased flow of higher pressure fuel past the valves 78 and 80 into the chamber 56.

During the above initial transient or non-equilibrium condition, the result of moving the lever 54 would be an acceleration along the dotted curve from point A to some point B on the sea level curve, FIGURE 5. As explained above, the resultant increased pressure $P_2$ in the chamber 56 would further open the linear restrictor valve 220 against the force of the spring 224 and supply more fuel to the engine via the outlet 244 and the conduit 46. As shown by FIGURE 4, fuel flow Wf increases lineally with increasing pressure differential, $P_2$–$P_3$, as determined by the preselected contour 230 of the valve 220.

The increased $F_2$ ($P_2$–$P_4$ applied to the feed-back diaphragm 172) would pivot the lever 54 downwardly in FIGURE 2, whereas the initial increased $CDP_3$ acting on the bellows 87 tends to pull the lever 54 upwardly. However, after the initial closing of the valve 362 past the ports 370 due to the compression of the spring 358 by the rotation of the cam 344 against the lever 348, the engine 10 would progressively increase in speed in response to the increased fuel flow from the centrifugal pump 40. The resultant increased pressure $P_1$ in the chambers 262 and 280 and in the passageways 290, 296 and 364 would thereupon act upon the valve 362, forcing it to the left in FIGURE 2, thereby once again opening the ports 370. The resultant increased pressure $P_5$ in the passageway 374 and the annulus 376 would thereupon move the valve stem 58 downwardly under force $F_3$ by acting upon the differential areas between the valve surfaces 62 and 378. This downward movement continues until the forces on the throttling stem 58 have become balanced by the combined effect of the pressure differential $P_2$–$P_4$ on the feed-back diaphragm 172, the pressure $P_5$ on the valve stem surface 379 and the pressure $CDP_3$ on the bellows 87. Since the above operation is at sea level, the resultant balanced condition would be represented by point B on the sea level curve of FIGURE 5.

Once the aircraft has taken off and while climbing to some altitude represented by point C in FIGURE 5, $CDP_1$, and hence $CDP_3$, will continuously decrease, causing the lever 54 to move progressively downwardly (FIGURE 2) due to the expansion of the bellows 87. While this will decrease the opening through the valves 78 and 80, thereby reducing the pressure $P_2$ in the chamber 56, the reduced pressure $P_2$ will permit the spring 224 to force the linear restrictor valve 220 toward the seat 216, thereby reducing fuel flow to the engine 10 and at the same time reducing pressure $P_3$ in the chambers 188 and 234, and hence also reducing the pressure $P_4$ in the chamber 168. The $P_2$–$P_4$ differential would, of course, be reduced with the decreased fuel flow, as previously explained. The decreased fuel flow would also result in the servo valve moving to the right (FIGURE 2), thereby reducing the pressure $P_5$ and resulting in a decreased $F_3$. Once again, the combination of forces $F_1$, $F_2$ and $F_3$ would bring the acceleration fuel system 52 back into an equilibrium condition.

Steady state or equilibrium operation represented by point C in FIGURE 5 would be maintained until such time, for example, as it would be desired to decrease speed. Decreasing speed would be accomplished by moving the selector lever 14 and the associated cam 344 in a clockwise direction, causing the lever 348 to move along the cam surface 344 from point X to some point Y. This reduces the compression of the spring 358 and permits the valve 362 to further open the ports 370. The effect of the increased fuel pressure $P_5$ on the surface 379 between the valve surfaces 62 and 378, as well as the decreased air pressure $CDP_3$ and the decreased pressure $P_4$ would result in deceleration from point C to point D along the dot-dash line of FIGURE 5. During this phase, the diaphragm washer 173 abuts against the minimum flow adjustment screw 176.

Acceleration from point D to a greater speed at a different altitude such as indicated by point E would be along the dash line to the dotted acceleration line, and then along the dotted line past B to E.

From the above description it will be apparent that a fuel control embodying the invention is adapted for use in any gas turbine engine having operating conditions typically represented by curves such as those shown by FIGURE 5.

On gas turbine engine specification sometimes required to be considered is, in effect, a plot of $W_f/CDP$ (the ratio of fuel flow to compressor discharge pressure) v. $N$ (speed). Some engines, for example, require a constant $W_f/CDP$ ratio over the entire speed range, as represented by line C–D of FIGURE 6. However, other engines may require a varying ratio such as that shown along the curve CEFG of FIGURE 6, wherein the ratio is greater at higher speeds.

The function of the speed bias device 460, which may be added to the system when desired, is to provide the effect illustrated by the above mentioned curve CEFG. This is accomplished by varying the position of the tapered end 470 of the valve extension 466 in the opening 472 in response to the speed indicative pressure differential $P_1$–$P_6$ across the valve face 478. When the taper 470 is inserted completely through the opening 472 into the chamber 236, the function of the diaphragm 172 influence on the lever 54 is as described above. However, as the taper 470 progresses out of the chamber 236 through the opening 472, a varying percentage of the fuel flow through the chamber 56 is diverted through the opening 472, into the chamber 236 and thence through the passageway into the chamber 168. Specifically, the effect on the lever 54 influences the $W_f/CDP$ v. $N$ relationship, as illustrated by line EF of FIGURE 6. Once the face 478 of the valve 462 abuts against the stop 482, a constant $W_f/CDP$ ratio continues over the remaining speed range, as represented by line FG of FIGURE 6.

The function of the previously mentioned adjustment device 184, which may be incorporated in the acceleration fuel system 52 in conjunction with the feed-back diaphragm 172 and the stem 174, is to maintain the reference of $CDP_3$ to absolute zero. This function may best be realized by refering to the curve of FIGURE 7. In other words, if after initial assembly it were discovered that the relationship of $W_f$ to $CDP_3$ was as represented by either of the dotted line curves $a$ or $b$, a correction to the solid line absolute zero curve could be obtained by simply adjusting the screw 184, thereby changing the starting position of the lever arm 54 hence the initial setting of the throttling valves 78 and 80.

The function of the compressor limiter assembly 126 is, as the name implies, to limit the maximum allowable compressor discharge pressure which enters the chamber 88. As illustrated in FIGURE 2, air under pressure $CDP_1$ enters the passageway 112 and thence the chamber 124 through the port 122. Should $CDP_1$ in the latter chamber increase beyond a predetermined amount, it will move the diaphragm 134 upwardly against the force of the spring 158, thereby raising the valve 164 off the seat 167 and bleeding $CDP_3$ to the atmosphere. This is accomplished via the chamber 132 and the leakage space which may be provided around the pivot pin 150 or through any other desired bleed port (not shown) formed in the wall of the housing 136. The resultant limited fuel flow through the valves 78 and 80 will decrease the speed of the engine 10 and thus bring $CDP_1$ back down to a corresponding value.

The function of the previously described igniter system 298 is to supply filtered fuel to the igniter 23 of the engine 10 via the conduit 24, either during the entire operation or above a predetermined percentage of maximum engine speed, depending upon the preloads of the springs 310 and 320 and the area of the diaphragm 314.

Filtered fuel at a pressure $P_1$ enters the passageway 294 through the filtering sleeve 276. It flows into the annulus 304 and through the opening 312 into the chamber 314 at a variable pressure $P_7$, depending upon the position of the valve 308 across the opening 312. It then flows through the fixed restriction 330 into the chamber 332 and to the igniter 23 via the conduit 24. The valve 308 is urged in an upward direction (FIGURE 2) by the force of the spring 320 through the extension 318. This spring force is supplemented by the pressure differential $P_8$–$P_7$ across the diaphragm 315 resulting from the build up of back pressure from the igniter into the chamber 316, thereby varying the opening 312 and the fuel flow to the igniter 23 as required.

As previously described, a hydraulic governor system 404 (FIGURE 3) may be used in lieu of the mechanical governor 300. In such a case, the hydraulic signal indicative of engine speed from a suitable external source (not shown) supplied through the inlet 438 and the passageway 440 into the chamber 432 will move the diaphragm 424. This, in turn, will move the piston 420, and hence, the servo valve 406, producing the same result as the movement of the servo valve 406 by the manual selector lever 14 and cam 344 against the lever 348 of the mechanical governor system.

From the above discussion it should be apparent that the invention provides a compact and reliable fuel control device which includes novel mechanical and hydraulic governor mechanisms, either of which may be used in conjunction with an external centrifugal pump, and wherein the magnitude of the pump pressure rise is used as an indication of speed. It should be further apparent that the system includes a novel speed biasing device for calibrating the $W_f/CDP$ v. $N$ relationship.

Although but two embodiments of the invention have been disclosed and described, it is apparent that other modifications may be made within the scope of the appended claims.

What we claim as our invention is:

1. A fuel control for a gas turbine engine having a pneumatic pressure source and a fuel system including an engine driven centrifugal pump, said fuel control comprising an acceleration fuel system including a throttling valve controlled by a force balance lever operatively connected thereto, means for moving said lever in response to said pneumatic pressure, feed-back means for moving said lever in response to changes in fuel flow to said engine, and governor means for balancing said lever in response to changes in engine speed as indicated by pump pressure rise.

2. A fuel control for a gas turbine engine having a compressor and a fuel system including an engine driven centrifugal pump, said fuel control comprising an acceleration fuel system including a throttling valve controlled by a force balance lever operatively connected thereto, means for moving said lever in response to compressor pressure, feed-back means for moving said lever in response to changes in fuel flow to said engine, and governor means for balancing said lever in response to changes in engine speed as indicated by pump pressure rise.

3. A fuel control for a gas turbine engine having a compressor and a fuel system including an engine driven centrifugal pump, said fuel control comprising an acceleration fuel system including a throttling valve controlled by a force balance lever operatively connected thereto, means for moving said lever in response to compressor discharge pressure, feed-back means for moving said lever in response to changes in fuel flow to said engine, and governor means for balancing said lever in response to changes in engine speed as indicated by pump pressure rise.

4. A fuel control for a gas turbine engine having a compressor and a fuel system including an engine driven centrifugal pump, said fuel control comprising an acceleration fuel system including a throttling valve controlled by a force balance lever operatively connected thereto, means for moving said lever in response to compressor pressure, feed-back means for moving said lever in response to changes in fuel flow to said engine, governor means for balancing said lever in response to changes in engine speed as indicated by pump pressure rise, and means for varying the fuel flow-compressor discharge pressure ratio over a predetermined range of engine speed.

5. The combination of a centrifugal pump and a fuel control mechanism, said mechanism comprising an inlet port, an outlet port, a passageway communicating between said inlet and outlet ports, a moment balance lever pivotally connected at one end thereof in said passageway, a throttling valve in said passageway pivotally connected to said lever at a point intermediate the ends thereof, a first pressure responsive device fixedly attached to said throttling valve so as to apply a force in one direction on said lever at said intermediate point, a second pressure responsive device pivotally connected to said lever at a second point therealong for applying a first opposite force on said lever at said second point and a governor system for applying a second opposite force on said lever at said intermediate point in response to the magnitude of the pump pressure rise.

6. The combination of a centrifugal pump and a fuel control mechanism, said fuel control mechanism comprising an inlet port, a conduit communicating between said centrifugal pump and said inlet port, an outer port, a passageway communicating between said inlet port and said outlet port, a closed loop moment balance system, said system including a lever pivotally connected at one end thereof in said passageway, a first valve means in said passageway, said first valve means being pivotally connected to said lever at substantially right angles thereto, a first pressure responsive device fixedly attached to a first valve means, and a second pressure responsive device pivotally connected to a second point along said lever, second valve means in said passageway, a second passageway communicating between said second pressure responsive device and said first passageway downstream of said second valve means, and a moment balance type governor system operating in conjunction with said centrifugal pump for influencing said first valve means, the magnitude of the pump pressure rise providing an indication of speed.

7. In a gas turbine engine having a compressor, a fuel supply tank, a centrifugal pump associated with said tank, a fuel distribution ring, and a manual selector lever, a fuel control comprising a throttling valve, a first pressure responsive device fixedly attached to an end of said throttling valve, a force balance lever pivotable about one end and pivotally attached at a point intermediate the ends thereof to said throttling valve, a first passageway communicating between said centrifugal pump and said throttling valve, a second passageway communicating between said throttling valve and said fuel distribution ring, a linear restrictor valve in said second passageway, a second pressure responsive device, a third passageway communicating between said second pressure responsive device and said second passageway downstream of said linear restrictor valve, a restriction in said third passageway, a member operatively connecting said second pressure responsive device to said force balance lever, a governor including a chamber and a cam operatively connected to said manual selector lever, a second lever pivotable about one end thereof, a piston slidably mounted in said governor chamber, a spring having one end thereof urging said piston against said second lever at a point intermediate the ends thereof and thereby urging said lever into contact with said cam, a fourth passageway having ports through the wall thereof, a servo valve slidably mounted in said fourth passageway and being urged past said ports by said spring, a fifth passageway communicating between said first and fourth passageways, and a sixth passageway communicating between said ports and said throttling valve.

8. The structure as defined in claim 7 and further including an opening between said third passageway downstream of said restriction and said second passageway, a second chamber, a speed bias valve slidably mounted in said second chamber, an annulus, a stem extending from an end face of said speed bias valve, said stem having a tapered end thereon and said end face forming a movable wall between said annulus and said second chamber, a spring in said chamber urging said tapered end through said opening, a third passageway communicating between said governor chamber and said second chamber, and an eighth passageway communicating between said annulus and said fifth passageway.

9. In a gas turbine engine having a compressor, a fuel supply tank, a centrifugal pump associated with said tank, a fuel distribution ring and a manual selector lever, a fuel control comprising a throttling valve, a first pressure responsive device fixedly attached to an end of said throttling valve, a force balance lever pivotable about one end and pivotally attached at a point intermediate the ends thereof to said throttling valve, a first passageway communicating between said centrifugal pump and said throttling valve, a second passageway communicating between said throttling valve and said fuel distribution ring, a linear restrictor valve in said second passageway, a second pressure responsive device, a third passageway communicating between said second pressure responsive device and said second passageway downstream of said linear restrictor valve, a restriction in said third passageway, a member operatively connecting said second pressure responsive device to said force balance lever, a governor chamber including a third pressure responsive device forming first and second chambers therein, an inlet, a fourth passageway communicating between said inlet and said first chamber, a spring retainer adjacent one side of said third pressure responsive device in said first chamber, an adjustable stop member in said first chamber, a spring mounted between said adjustable stop member and said spring retainer for urging said spring retainer against said third pressure responsive device, a slidably mounted piston in said second chamber adjacent the other side of said third pressure responsive device, a fifth passageway having ports through the wall thereof, a servo valve slidably mounted in said fifth passageway and being urged by a spring into contact with said slidably mounted piston in a direction tending to open said ports, a sixth passageway communicating between said first and fifth passageways and a seventh passageway communicating between said ports and said throttling valve.

10. The structure as defined in claim 9 and further including an opening between said third passageway downstream of said restriction and said second passageway, a third chamber, a speed bias valve slidably mounted in said third chamber, an annulus, a stem extending from an end face of said speed bias valve, said stem having a tapered end thereon and said end face forming a movable wall between said annulus and said third chamber, a spring in said third chamber urging said stem so that said tapered end extends through said opening, a seventh passageway communicating between said second chamber and said third chamber, and an eighth passageway communicating between said annulus and said fifth passageway.

11. In combination with the device described in claim 5 a filtering system in said passageway, an igniter valve having first, second and third chambers therein, a third pressure responsive device forming a movable wall between said first and second chambers, an opening in the side wall of said first chamber, a second passageway communicating between said filtering system and said opening, a spring slidably mounted in said first chamber, a spring urging said valve past said opening against a member extended from said third pressure responsive device, a third passageway including a fixed restriction therein communicating between said first chamber and said third chamber, a fourth passageway communicating between said second and third chambers and an outlet from said third chamber.

12. A fuel control for a gas turbine engine having a compressor and a fuel system including a centrifugal pump, said fuel control comprising an acceleration fuel system including a throttling valve controlled by a force balance lever operatively connected thereto, means for moving said lever in response to compressor pressure, feed-back means for moving said lever in response to changes in fuel flow to said engine, and governor means for balancing said lever in response to changes in engine speed as indicated by pump pressure rise, said governor means comprising a manual selector lever, a cam, linkage means connecting said manual selector lever and said cam, a slidably operated piston, a lever pivotable about one end thereof and located between said cam and said piston, a spring urging said piston into contact with said lever and said lever into contact with said cam, a valve urged by the other end of said spring in a direction away from said piston, a means for communication of fluid past said valve and to said throttling valve, means for limiting the maximum compressor discharge pressure, said means comprising a first passageway having a fixed restriction therein, first and second chambers, a pressure responsive device forming a movable wall between said first and second chambers, a port communicating between said first chamber and said passageway upstream of said fixed restriction, an opening in the wall of said second chamber, a second passageway communicating between said opening and said first passageway downstream of said fixed restriction, a lever pivotally mounted about one end thereof in said second chamber, a valve formed on said lever adjacent said opening, a spring urging said lever in a direction tending to close off said opening by said valve, a member extending from said pressure responsive device against said lever opposite said spring, and an atmospheric bleed in said second chamber.

13. A fuel control for a gas turbine engine having a compressor and a fuel system including a centrifugal pump, said fuel control comprising an acceleration fuel system including a throttling valve controlled by a force balance lever operatively connected thereto, means for moving said lever in response to compressor pressure, feed-back means for moving said lever in response to changes in fuel flow to said engine, and governor means for balancing said lever in response to changes in engine speed as indicated by pump pressure rise, said governor means comprising a manual selector lever, a cam, linkage means connecting said manual selector lever and said cam, a slidably operated piston, a lever pivotable about one end thereof and located between said cam and said piston, a spring urging said piston into contact with said lever and said lever into contact with said cam, a valve urged by the other end of said spring in a direction away from said piston, a means for communication of fluid past said valve and to said throttling valve, means for limiting the increase in compressor discharge pressure due solely to changes in temperature, said means comprising a first passageway in said fuel control, said passageway having a pair of fixed restrictions therein, a separate housing including an inlet, a chamber and a bleed orifice therein, an internal flange in said chamber, a valve stem having a valve formed on one end thereof and a retainer formed on the other end thereof, a spring mounted between said internal flange and a spring retainer fixedly attached to said valve stem for urging said valve in a direction tending to close said bleed orifice, a plurality of temperature responsive disks mounted around said valve stem between said internal flange and said end retainer.

References Cited by the Examiner
UNITED STATES PATENTS

| | | | |
|---|---|---|---|
| 2,457,595 | 12/1948 | Orr | 170—135.71 |
| 2,576,541 | 11/1951 | Schmitt | 137—506 |
| 2,769,488 | 11/1956 | Harris et al. | 60—39.28 X |
| 2,911,999 | 11/1959 | Lamb | 137—506 |
| 2,943,447 | 7/1960 | Davies | 60—39.28 |
| 3,020,925 | 2/1962 | Randall et al. | 137—489.5 |
| 3,062,007 | 11/1962 | Szydlowski | 60—39.28 |
| 3,064,675 | 11/1962 | Johnson et al. | 137—489.5 |
| 3,076,311 | 2/1963 | Johnson | 60—39.28 |

JULIUS E. WEST, *Primary Examiner.*